(12) United States Patent
Lindgren

(10) Patent No.: US 7,965,993 B2
(45) Date of Patent: Jun. 21, 2011

(54) METHOD FOR POLARIZATION CORRECTION IN USER EQUIPMENT

(75) Inventor: Ulf Lindgren, Västra Frölunda (SE)

(73) Assignee: Telefonaktiebolaget L M Ericsson (Publ), Stockholm (SE)

(*) Notice: Subject to any disclaimer, the term of this patent is extended or adjusted under 35 U.S.C. 154(b) by 694 days.

(21) Appl. No.: 12/088,652

(22) PCT Filed: Sep. 29, 2006

(86) PCT No.: PCT/EP2006/066932
§ 371 (c)(1),
(2), (4) Date: Mar. 28, 2008

(87) PCT Pub. No.: WO2007/039582
PCT Pub. Date: Apr. 12, 2007

(65) Prior Publication Data
US 2008/0293362 A1    Nov. 27, 2008

(30) Foreign Application Priority Data
Sep. 30, 2005 (SE) .................. PCT/SE2005/001449

(51) Int. Cl.
*H04B 17/00* (2006.01)
*H04B 1/06* (2006.01)

(52) U.S. Cl. .................. 455/226.1; 455/272; 455/278.1

(58) Field of Classification Search .................. 455/63.1, 455/67.13, 226.1, 269, 272, 273, 278.1, 295, 455/296
See application file for complete search history.

(56) References Cited

U.S. PATENT DOCUMENTS

| | | | | |
|---|---|---|---|---|
| 5,933,421 | A * | 8/1999 | Alamouti et al. | 370/330 |
| 6,731,704 | B1 * | 5/2004 | Kiyanagi | 455/296 |
| 7,277,731 | B2 * | 10/2007 | Stratis et al. | 455/562.1 |
| 7,715,495 | B2 * | 5/2010 | Ahn et al. | 375/299 |

* cited by examiner

Primary Examiner — Quochien B Vuong
(74) Attorney, Agent, or Firm — Roger S. Burleigh

(57) ABSTRACT

A method and device for compensation of received signal components at a user equipment (UE) used for receiving signal components from a radio base station (RBS). The signal components have at least a first and a second polarization orientation, respectively. The intended reception of the signal component ($Y_h(n)$) having the first polarization deviates from the polarization orientation of the transmitted signal component ($X_h(n)$) having the first polarization by a first angle ($\varphi$), and the intended reception of the signal component ($Y_v(n)$) having the second polarization deviates from the polarization orientation of the transmitted signal component ($xv(n)$) having the second polarization by a second angle ($\theta$). The method comprises the steps: determining the correlation values ($Ry_{vv}$, $Ry_{vy}$, $Ry_{yv}$, $Ry_{yy}$) for the received signals ($Y_h$, $Y_v$) at a first time (k) and a second time (m); using these values to determine the deviation angles ($\varphi$, $\theta$) performing said compensation using the deviation angles ($\varphi$, $\theta$).

10 Claims, 2 Drawing Sheets

METHOD FOR POLARIZATION CORRECTION IN USER EQUIPMENT

TECHNICAL FIELD

The present invention relates to a method for compensation of received signal components at a user equipment (UE) used for receiving signal components from a radio base station (RBS), which signal components have at least a first and a second polarization orientation, respectively, which signal components have been transmitted in a channel, and where the intended reception of the signal component having the first polarization deviates from the polarization orientation of the transmitted signal component having the first polarization by a first angle, and where the intended reception of the signal component having the second polarization deviates from the polarization orientation of the transmitted signal component having the second polarization by a second angle.

The present invention also relates to a device in the form of user equipment (UE) intended for use in a mobile phone network system, having at least a first and second antenna, which antennas are used to receive a message sent on at least a first and second polarization from a radio base station (RBS).

BACKGROUND ART

A radio base station (RBS) for mobile communication can deploy antennas of various polarization. The use of different polarisations has previously been to achieve so-called polarization diversity, i.e. to minimize the risk of fading by sending and receiving the same information on the polarizations available. This method is thus deploying redundancy as a mean to accomplish the goal to minimize the risk of fading.

Today, this redundancy method is dispensed with, since it has been found more efficient to send and receive different information on the different respective polarizations available. To send and receive different information on the different respective polarizations available is for example deployed in MIMO (Multiple Input Multiple Output) systems.

However, it has been observed that a radio channel in an urban environment mainly preserves those polarization directions which are essentially horizontal and vertical. The main reason for that is the geometry of the landscape, in an urban environment there are buildings having a vertical direction and a ground having a horizontal direction. Generally, this means that a vertically polarized wave will reflect in buildings but not in the ground and vice versa for a horizontally polarized wave. Hence, vertical will remain essentially vertical and horizontal will remain essentially horizontal during propagation in the urban environment channel.

For example, a user equipment (UE), having a first and second antenna designed for reception of incoming signals having a horizontal and vertical polarization, respectively, is used to receive a message sent on a horizontal and vertical polarization from an RBS in an urban environment. The UE has a certain rotational position, i.e. the antennas are positioned in a certain way in relation to the incoming horizontally and vertically polarized signals. This results in an angle between the polarization orientation of the first antenna and the polarization orientation of the horizontally polarized incoming signal, and another angle between the polarization orientation of the second antenna and the polarization orientation of the vertically polarized incoming signal. It is apparent that the observed antenna signals depend on the rotational position of the UE, where each antenna may receive signals originating from both of the incoming signals.

This presents a problem, since the information that is sent on the horizontal polarization not only is received by the first antenna of the UE, intended for horizontal polarization, but partly also is received by the second antenna of the UE, intended for vertical polarization. A corresponding problem is apparent for information that is sent on the vertical polarization. Generally, the polarizations need not be essentially horizontal and vertical, but may have any orientation, in the general case a first and a second polarization.

Therefore, the information that is sent on the first polarization and the information that is sent on the second polarization may become mixed up in the UE, and there is thus a need for separating the information that is sent on the first polarization and the information that is sent on the second polarization.

DISCLOSURE OF THE INVENTION

The objective problem that is solved by means of the present invention is to separate the information that is sent on the first polarization and the information that is sent on the second polarization, since the information that is sent on the first polarization and the information that is sent on the second polarization may become mixed up in the UE.

Said problem is solved by means of a method as mentioned in the introduction, where furthermore the method comprises the steps: determining the correlation values for the received signals of the at least two different polarization orientations at a first time and a second time, using the determined correlation values to determine the deviation angles between the polarization orientations of the transmitted and the received signal components and performing said compensation of the received signal components using the deviation angles.

A number of advantages are acquired by means of the present invention:

The method according to the invention may be implemented with low complexity

Leakage due to the channel may be compensated for

The method may be used for combining MIMO and diversity processing, since it provides means for sorting the polarizations after reception

BRIEF DESCRIPTION OF THE DRAWINGS

The invention will now be described more in detail with reference to the drawings, where.

PREFERRED EMBODIMENTS

Figure 1:
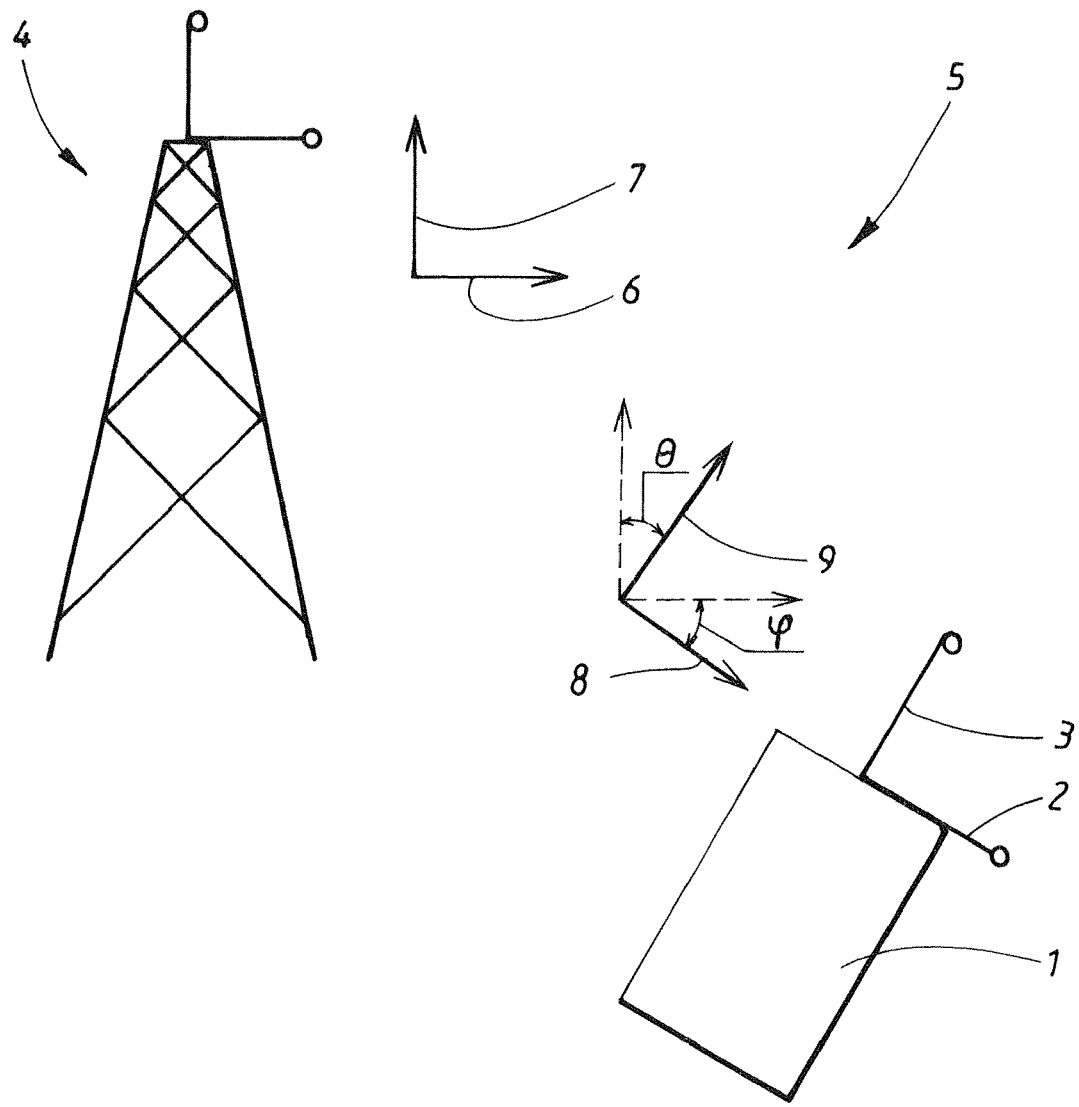
FIG. 1 shows a system with a radio base station and a user equipment.

As shown in FIG. 1, a user equipment 1 (UE) intended for use in a mobile phone network system has a first 2 and second 3 antenna, which antennas 2, 3 are used to receive a message sent on a first and second polarization, in the embodiment example a horizontal and a vertical polarization, from a radio base station 4 (RBS) in an urban environment 5. The UE (1) may for example be a mobile phone or a portable computer. The channel in itself is assumed to be of an ideal nature in this embodiment example, i.e. it does not change the polarization rotation of the signals.

Due to the UE 1 having a certain rotational position, the first antenna 2 in the UE 1, the polarization orientation of the antenna intended for reception of horizontal polarization, deviates from the polarization orientation of a horizontally transmitted signal 6 by an angle φ. Furthermore, the polarization orientation of the second antenna 3 in the UE 1, the antenna intended for reception of vertical polarization, deviates from the polarization orientation of a vertically transmitted signal 7 by an angle θ. Therefore, the UE 1 receives a horizontal signal 8 which deviates from the polarization of the transmitted horizontal signal 6 by the angle φ and a vertical signal 9 which deviates from the transmitted vertical signal 7 by the angle θ. In other words, the antenna's 2, 3 polarizations are misaligned with the polarizations of the transmitted, signals 6, 7, incoming to the UE (1). The misalignment is measured by means of the deviation angles φ, θ.

These deviation angles φ, θ are related to first and second deviation terms α and β, which relate to the degree of deviation that occurs at the moment. α represents a relative measure of how much of the horizontally transmitted signal 6 that is received by the second antenna 3. In the same manner, β represents a relative measure of how much of the vertically transmitted signal 7 that is received by the first antenna 2. Mathematically, the terms α and β may be expressed as $$\alpha = \sin \phi$$

$$\beta = \sin \theta$$

This means that if the angles θ and φ equals 0°, i.e. there is no deviation, the terms α and β equal 0. If the angles θ and φ equals 45°, the terms α and β equal $1/\sqrt{2}$. If the angles θ and φ equals 90°, i.e. the first antenna 2 only receives the vertically transmitted signal 7 and the second antenna 3 only receives the horizontally transmitted signal 6, the terms α and β equal 1.

The signals received by the UE can be described as $$\begin{bmatrix} y_h(n) \\ y_v(n) \end{bmatrix} = \begin{bmatrix} 1-\alpha(n) & \beta(n) \\ \alpha(n) & 1-\beta(n) \end{bmatrix} \begin{bmatrix} x_h(n) \\ x_v(n) \end{bmatrix} \quad (1)$$

The vector $$\begin{bmatrix} y_h(n) \\ y_v(n) \end{bmatrix}$$

is called Y(n), the vector $$\begin{bmatrix} x_h(n) \\ x_v(n) \end{bmatrix}$$

is called X(n), and the matrix $$\begin{bmatrix} 1-\alpha(n) & \beta(n) \\ \alpha(n) & 1-\beta(n) \end{bmatrix}$$

is called $\tilde{B}(n)$ such that $$Y(n) = \begin{bmatrix} 1-\alpha(n) & \beta(n) \\ \alpha(n) & 1-\beta(n) \end{bmatrix} \cdot X(n) = \tilde{B}(n) \cdot X(n)$$

If α and β=0, then Y(n)=X(n).

Here $x_h(n)$ represents the transmitted horizontal signal 6, $x_v(n)$ represents the transmitted vertical signal 7, $y_h(n)$ represents the received horizontal signal 8 and $y_v(n)$ represents the received vertical signal 9.

Therefore, α represents the deviation term for the first antenna 2 in the UE 1, the antenna intended for reception of horizontal polarization. In other words, α represents a relative measure of how much the polarization orientation of the received horizontal signal 8 $y_h(n)$ deviates from the polarization orientation of the horizontally transmitted signal 6 $x_h(n)$. Furthermore, β thus represents the deviation term for the second antenna 3 in the UE 1, the antenna intended for reception of vertical polarization. In other words, β represents a measure of how much the polarization orientation of the received vertical signal 9 $y_v(n)$ deviates from the polarization orientation of the vertically transmitted signal 7 $x_v(n)$. The properties of the deviation terms α, β have been discussed previously.

To compensate for these deviations terms α, β, the present invention comprises a method for de-rotation of the signals. In other words, the method compensates for the misalignment between the antenna's 2, 3 polarizations and the polarizations of the transmitted, signals 6, 7, incoming to the UE (1), by performing a rotation of the signals 6, 7. In order to perform such a rotation, deviations terms α, β and the corresponding the deviation angles φ, θ have to be found.

The present invention requires two assumptions A1 and A2. The first assumption A1 is that the signals $x_h(n)$ and $x_v(n)$ are mutually uncorrelated stationary processes. The second assumption is that the covariance function of the signals $x_h(n)$ and $x_v(n)$ has support outside zero, i.e. the signals $x_h(n)$ and $x_v(n)$ are not white.

The first assumption is necessary since the signals have to be different, i.e. uncorrelated. The second assumption is necessary since the reasoning below otherwise will lead to an infinite number of solutions, and in other words the problem is then not identifiable.

The first assumption may be written with mathematical terms as $$A1: E[x_h(n_1)x_v(n_2)] = 0, \forall n_1, n_2,$$

i.e. the expected value of the product of $x_h(n_1)$ and $x_v(n_2)$ is zero for all values of $n_1$ and $n_2$.

The second assumption may be written with mathematical terms as $$A2: |\{R_{xh}(n_1), R_{xv}(n_2): R_{xh}(n_1) \neq 0, R_{xv}(n_2) \neq 0 \, \forall n_1, n_2\}| > 2,$$

i.e. there is a quantity of at least three correlation values $R_{xh}(n_1)$, $R_{xv}(n_2)$, not being equal to zero, for all values of $n_1$ and $n_2$. The respective correlation values $R_{xh}(n_1)$, $R_{xv}(n_2)$ are acquired when the expected value E operates on the respective signal $x_h(n_1)$, $x_v(n_2)$.

As mentioned previously, it is also assumed that the channel in itself is of an ideal nature in this embodiment example, i.e. it does not change the polarization rotation of the signals.

The matrix $$\tilde{B}(n) = \begin{bmatrix} 1-\alpha(n) & \beta(n) \\ \alpha(n) & 1-\beta(n) \end{bmatrix}$$

in equation (1) is now scaled with the matrix $$C(n) = \begin{bmatrix} \dfrac{1}{1-\alpha(n)} & 0 \\ 0 & \dfrac{1}{1-\beta(n)} \end{bmatrix}$$

such that $$B(n) = C(n) \begin{bmatrix} 1-\alpha(n) & \beta(n) \\ \alpha(n) & 1-\beta(n) \end{bmatrix} \quad (2)$$

$$= \begin{bmatrix} 1 & \frac{\beta(n)}{1-\alpha(n)} \\ \frac{\alpha(n)}{1-\beta(n)} & 1 \end{bmatrix}$$

$$= \begin{bmatrix} 1 & b_{12}(n) \\ b_{12}(n) & 1 \end{bmatrix}$$

or, in a more compact writing:

$B(n)=C(n)\cdot \tilde{B}(n)$

Thus $$b_{12}(n) = \frac{\beta(n)}{1-\alpha(n)}$$

$$b_{21}(n) = \frac{\alpha(n)}{1-\beta(n)}$$

Hence the unknowns which we want to solve for, are $b_{12}(n)$ and $b_{21}(n)$.

Based on the assumption A1, we now form two new signals $s_h(n)$ and $s_v(n)$. We are going to use these signals $s_h(n)$, $s_v(n)$ as a mathematical tool for calculating the transmitted signals $x_h(n)$, $x_v(n)$ starting from the received signals, $y_h(n)$, $y_v(n)$.

The new signals $s_h(n)$ and $s_v(n)$ form the vector $$S(n) = \begin{bmatrix} s_h(n) \\ s_v(n) \end{bmatrix}$$

We now introduce the matrix D, where D comprises the two functions $d_{12}$ and $d_{21}$.

$$D(n) = \begin{bmatrix} 1 & -d_{12}(n) \\ -d_{21}(n) & 1 \end{bmatrix}$$

The relation between S and D and Y is such that $$\begin{bmatrix} s_h(n) \\ s_v(n) \end{bmatrix} = \begin{bmatrix} 1 & -d_{12}(n) \\ -d_{21}(n) & 1 \end{bmatrix} \cdot \begin{bmatrix} y_h(n) \\ y_v(n) \end{bmatrix} \quad (3)$$

or, written in a more compact form, $S(n)=D(n)\cdot Y(n)$

We now write $Y(n)=C(n)\cdot \tilde{B}(n)\cdot X(n)=B(n)\cdot X(n)$

Thus equation (3) in its compact form becomes $S(n)=D(n)\cdot B(n)\cdot X(n)$ \quad (4)

Generally, in order to solve for the unknowns $b_{12}(n)$ and $b_{21}(n)$, we have to choose the functions $d_{12}(n)$ and $d_{21}(n)$ in such a way that the product $D(n)\cdot B(n)$ becomes a diagonal matrix with zeros in the diagonal or in the anti-diagonal.

If $d_{12}(n)=b_{12}(n)$ $d_{21}(n)=b_{21}(n)$, then we write for $D(n)\cdot B(n)$:

$$D(n)\cdot B(n) = \begin{bmatrix} 1-b_{12}(n)d_{21}(n) & b_{12}(n)-d_{12}(n) \\ b_{21}(n)-d_{21}(n) & 1-b_{21}(n)d_{12}(n) \end{bmatrix} = \quad (5)$$

$$= \begin{bmatrix} 1-d_{12}(n)d_{21}(n) & 0 \\ 0 & 1-d_{21}(n)d_{12}(n) \end{bmatrix}$$

When equation (5) is put into equation (4):

$S(n)=D(n)\cdot B(n)\cdot X(n) \Rightarrow$

S(n) is proportional to X(n), in other words $S(n)=\text{constant}\cdot X(n)$

In order to compensate for the constant, it is instead assumed that $D(n)=B(n)^{-1}$ which leads to $S(n)=B(n)^{-1}\cdot B(n)\cdot X(n)=X(n)$ \quad (6)

Hence, the matrix D(n) has to be found in order to solve equation (6) according to the above.

According to A1, $E[x_h(n_1)x_v(n_2)]=0$ leading to $E[s_h(n_1)s_v(n_2)]=0$ if, and only if $D(n)=B(n)^{-1}$.

According to equation 3, $$\begin{bmatrix} s_h(n) \\ s_v(n) \end{bmatrix} = \begin{bmatrix} 1 & -d_{12} \\ -d_{21} & 1 \end{bmatrix} \cdot \begin{bmatrix} y_h(n) \\ y_v(n) \end{bmatrix}$$

$$= \begin{bmatrix} y_h(n)-d_{12}y_v(n) \\ -d_{21}y_h(n)+y_v(n) \end{bmatrix}$$

We want that $E[s_h(n_1)s_v(n_2)]=0$ which leads to $E[(y_h(n_1)-d_{12}y_v(n_1))(-d_{21}y_h(n_2)+y_v(n_2))]=E[y_h(n_1)y_v(n_2)-d_{21}y_h(n_1)y_h(n_2)-d_{12}y_v(n_1)y_v(n_2)+d_{12}d_{21}y_h(n_2)y_v(n_1)]=0$ \quad (7)

Now, the expected value E operates on the respective signals, resulting in corresponding correlation values R.

The correlation is, as known to those skilled in the art, generally defined as $R_{xy}(t_1) \stackrel{\Delta}{=} E[x(t+t_1)y(t)]$ Equation (6) thus leads to equation (8) below:

$Ry_{hv}(n_1-n_2)-d_{21}Ry_{hh}(n_1-n_2)-d_{12}Ry_{vv}(n_1-n_2)+d_{12}d_{21}Ry_{vh}(n_1-n_2)=0$ \quad (8)

Solving for $d_{12}$ yields, with $n_1-n_2=p$ $$d_{12} = \frac{Ry_{hv}(p) - d_{21}Ry_{hh}(p)}{Ry_{vv}(p) - d_{21}Ry_{vh}(p)} \quad (9)$$

The temporal variable p in equation (9), represents a time difference (lag). Hence, selecting two different values of p in equation 8, provides two equations which both are equal to $d_{12}$. These two different values of p are in the following called m and k. In other words, we then acquire two unknowns and two equations by varying p.

The two different values of time, m and k, are inserted into equation (9), and by substitution we acquire equation (10):

$$\frac{Ry_{hv}(m) - d_{21}Ry_{hh}(m)}{Ry_{vv}(m) - d_{21}Ry_{vh}(m)} = \frac{Ry_{hv}(k) - d_{21}Ry_{hh}(k)}{Ry_{vv}(k) - d_{21}Ry_{vh}(k)} \quad (10)$$

As obvious from equation (10), the case were m=k would not lead to any specific solution since the equation system then is under-determined. The result would then be an infinite number of solutions, all located along a parabola, which in turn means that the problem no longer is identifiable.

Cross-multiplication in equation (10) leads to:

$$(Ry_{hv}(m)-d_{21}Ry_{hh}(m))(Ry_{vv}(k)-d_{21}Ry_{vh}(k))=(Ry_{hv}(k)-d_{21}Ry_{hh}(k))(Ry_{vv}(m)-d_{21}Ry_{vh}(m)) \quad (11)$$

This is an equation where the solution $d_{21}$ is located on a hyperbola. The terms Ry are all possible to estimate by means of signal processing in the UE in a previously known manner, which will not be described in any more detail here.

Equation (11) results in a second-degree polynomial having two roots for the solution $d_{21}$. The polynomial is thus on the form $$a_2(m,k)d_{21}^2 + a_1(m,k)d_{21} + a_0(m,k) = 0$$

Solving of the equation (11) leads to the following coefficients:

$$a_0(m,k) = Ry_{vv}(k)Ry_{hv}(m) - Ry_{vv}(m)Ry_{hv}(k) \quad (12)$$

$$a_1(m,k) = Ry_{vv}(m)Ry_{hh}(k) - Ry_{vv}(k)Ry_{hv}(m) + Ry_{vh}(m)Ry_{hv}(k) - Ry_{vh}(k)Ry_{hv}(m) \quad (13)$$

$$a_2(m,k) = Ry_{hh}(m)Ry_{vh}(k) - Ry_{hh}(k)Ry_{vh}(m) \quad (14)$$

From equation (9), $d_{12}$ is solved as $$d_{12} = \frac{Ry_{hv}(m) - d_{21}Ry_{hh}(m)}{Ry_{vv}(m) - d_{21}Ry_{vh}(m)} = \frac{Ry_{hv}(k) - d_{21}Ry_{hh}(k)}{Ry_{vv}(k) - d_{21}Ry_{vh}(k)}$$

Figure 2:
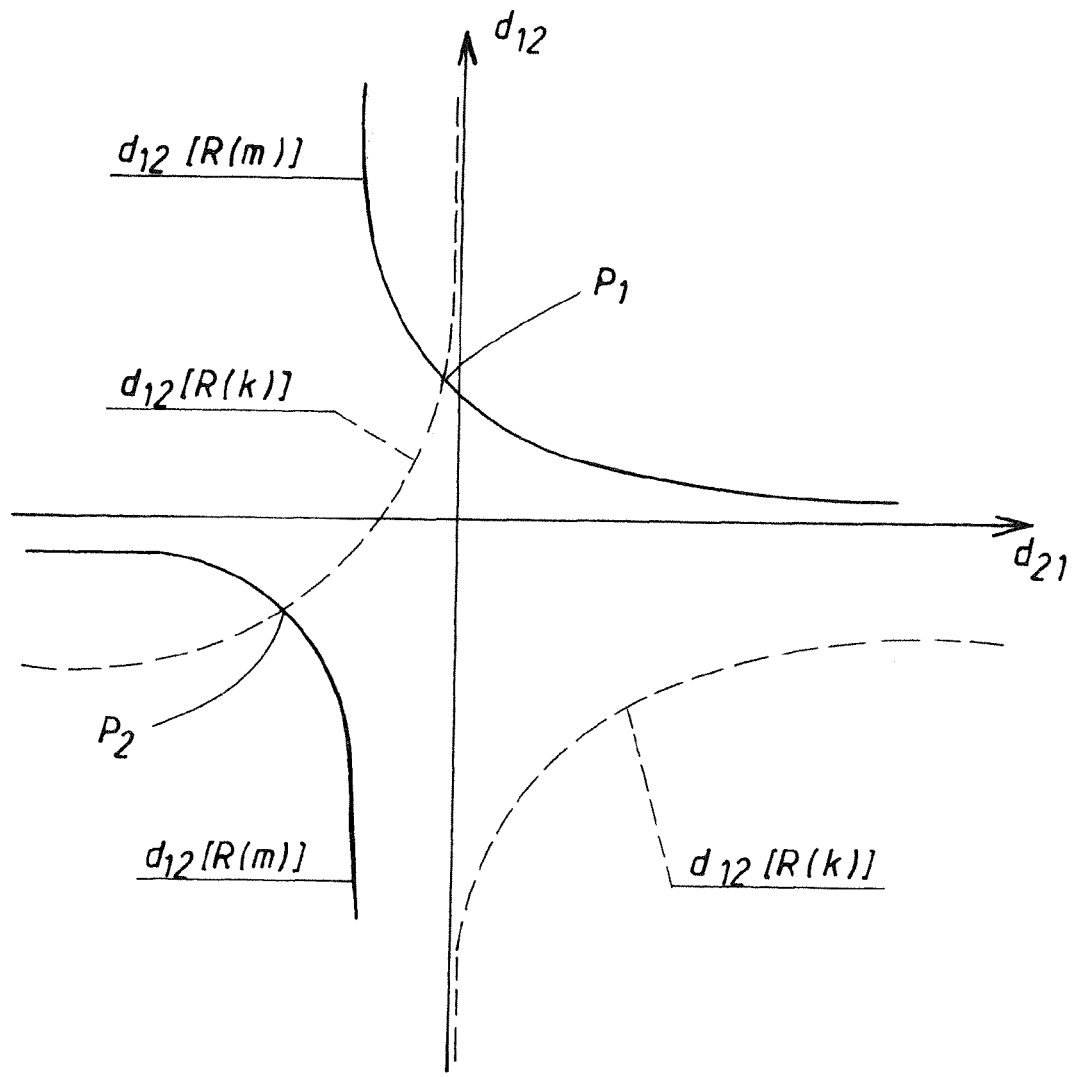
FIG. 2 shows a graphical illustration of the two solutions to the mathematical problems according to the first embodiment.

As shown in FIG. 2, the hyperbolic functions $D_{12}(R)$ are shown for the values of m and k. For every m and k, one special form of the parabolic curve is acquired. Where these hyperbolic functions intersect, in the points P1 and P2, the two solutions for $d_{12}$ are acquired.

One of the solutions is the desired one, and the other one corresponds to that the vertical and horizontal polarization are exchanged. Mathematically, it means that the diagonal matrix in equation (5) has its diagonal of zeros in the other (main) diagonal of the matrix. In order to find out which one of the solutions that is the desired one, a unique coding may be applied at the signal. Different signal strengths for the polarizations may also be used.

The method according to the invention as described above applies to two different polarizations, but of course said method generally applies to any number of polarizations. The number of roots or solutions is equal to the faculty of the number of polarizations. If, for example, three polarizations are used, six different solutions are acquired, which solutions are permutations.

Regarding how the compensation of the signal is performed, two main methods are preferred. Both methods comprise rotation, meaning that the deviation angles $\phi$, $\theta$ are compensated for by means of mathematically rotating the polarizations a certain angular distance each, said angular distances corresponding to the deviation angles $\phi$, $\theta$. The first method works by performing a de-rotation in the UE 1, where the calculation is performed. The second method works by performing a pre-rotation in the RBS 4. If the first method is employed, no communication is required between the UE 1 and the RBS 4 for performing the de-rotation. If the second method is employed, the UE 1 needs to communicate the details of the desired pre-rotation to the RBS 4, since the calculation are performed in the UE 1.

It is also conceivable to use a combination of the two combination methods according to the above.

The invention is not limited to the embodiment described above, but may vary freely within the scope of the appended claims. For example, the method may be formulated for an over-determined system of equations. This is advantageous if the numerical solution is difficult by some reason, for example if the problem is ill-conditioned. This type of solution can be obtained from $$0 = R(M,K)c \quad (15)$$

$$= \begin{bmatrix} R_{21}(M) & R_{22}(M) & R_{11}(M) & R_{12}(M) \\ \vdots & \vdots & \vdots & \vdots \\ R_{21}(K) & R_{22}(K) & R_{11}(K) & R_{12}(K) \end{bmatrix} \cdot \begin{bmatrix} d_{12}d_{12} \\ d_{12} \\ d_{21} \\ 1 \end{bmatrix}$$

In equation (15), two solutions are solved for each line in the matrix R(M, K). Equation (15) is for example solved by means of the least-square method in am manner well known to the skilled person.

Furthermore, the present invention is applicable for any number of polarizations from two and upwards. The number of antennas on the UE 1 may vary from two and upwards.

The polarization orientations horizontal and vertical used are for explanatory reasons only. The present invention is applicable for any polarization orientations, as long as the assumptions A1 and A2 for the signals are fulfilled.

The deviation angles $\phi$, $\theta$ may have any known relationship to the deviation terms $\alpha$, $\beta$ fulfilling its purpose according to the method of the present invention.

The environment has for explanatory reasons been an urban environment, but this is not necessary for the present invention, which may be implemented in any environment. In the ideal case, the channel does not affect and/or change the signal in any way, in reality the channel does affect and/or change the signal.

The invention claimed is:

1. Method for compensation of received signal components at a user equipment (UE) used for receiving signal components from a radio base station (RBS), which signal components have at least a first and a second polarization orientation, respectively, which signal components have been transmitted in a channel, and where the intended reception of the signal component ($Y_h(n)$) having a first polarization deviates from a polarization orientation of the transmitted signal component ($x_h(n)$) having the first polarization by a first angle ($\phi$), and where the intended reception of the signal component ($y_v(n)$) having a second polarization deviates from the polarization orientation of the transmitted signal component ($x_v(n)$) having the second polarization by a second angle ($\beta$), wherein the method comprises the steps:
- determining correlation values ($Ry_{vv}$, $Ry_{vy}$, $Ry_{yv}$, $Ry_{yy}$) for the received signals ($Y_h$, $Y_v$) of the at least two different polarization orientations at a first time (k) and a second time (m);
- using the determined correlation values ($Ry_{vv}$, $Ry_{vy}$, $Ry_{yv}$, $Ry_{yy}$), to determine deviation angles ($\phi$, $\theta$) between the polarization orientations of the transmitted ($x_h(n)$, $x_v(n)$) and the received ($y_h(n)$, $y_v(n)$) signal components;
- performing said compensation of the received signal components ($y_h(n)$, $y_v(n)$) using the deviation angles ($\phi$, $\theta$).

2. Method according to claim 1, wherein said deviation angles ($\phi$, $\theta$) are related to corresponding first ($\alpha$) and second deviation terms ($\beta$), where further the transmitted signal components ($x_h(n)$, $x_v(n)$) are uncorrelated (A1), and where the covariance function of the transmitted signal components ($x_h(n)$, $x_v(n)$) has more than two values that is not zero for all times (n) of the transmitted time-dependent signal components ($x_h(n)$, $x_v(n)$) (A2).

3. Method according to claim 2, wherein the first deviation term equals sinus of the first angle ($\alpha=\sin \phi$) and the second deviation term equals sinus of the second angle ($\beta=\sin \theta$).

4. Method according to anyone of the claim 2, wherein the method also comprises the following steps:
- setting up a first mathematical relationship between the transmitted ($x_h(n)$, $x_v(n)$) and the received ($y_h(n)$, $y_v(n)$) signal components, comprising a number of unknowns related to the first ($\alpha$) and second deviation terms ($\beta$), which number corresponds to the faculty of the number of polarization orientations used, where the first mathematical relationship is dependent on time (n) only;
- letting the expected value operate on the first mathematical relationship resulting in correlations for the transmitted ($x_h(n)$, $x_v(n)$) and the received ($y_h(n)$, $y_v(n)$) signal components, leading to a second mathematical relationship where the second mathematical relationship is dependent on a lag of time (n1−n2=p) only;
- setting up the second mathematical relationship for the first time (k) and the second time (m), where the first time (k) and the second time (m) are unequal to each other, leading to a mathematical expression where the second mathematical relationships of the different times (m, k) equals each other.

5. Method according to claim 1, wherein unique coding is applied to the transmitted signals ($x_h(n)$, $x_v(n)$) in order to acquire the correct solution when solving the mathematical expression using the determined correlation values ($Ry_{vv}$, $Ry_{vy}$, $Ry_{yv}$, $Ry_{yy}$), revealing the unknowns.

6. Method according to claim 1, wherein different signal strengths are applied to the transmitted signals ($x_h(n)$, $x_v(n)$) in order to acquire the correct solution when solving the mathematical expression using the determined correlation values ($Ry_{vv}$, $Ry_{vy}$, $Ry_{yv}$, $Ry_{yy}$), revealing the unknowns.

7. Method according to claim 1, wherein the compensation is performed as a de-rotation in the UE.

8. Method according to claim 1, wherein the compensation is performed as a pre-rotation in the radio base station (RBS) using calculation results performed in the UE.

9. Method according to claim 1, wherein the compensation is performed as a combination of a de-rotation in the user equipment and a pre-rotation in the radio base station (RBS) using calculation results performed in the UE.

10. Device in the form of user equipment (UE) intended for use in a mobile phone network system, having at least a first and second antenna, which antennas are used to receive a message sent on at least a first and second polarization from a radio base station (RBS), wherein the device is arranged for executing the method according to claim 1.

* * * * *

UNITED STATES PATENT AND TRADEMARK OFFICE
CERTIFICATE OF CORRECTION

PATENT NO.       : 7,965,993 B2                                    Page 1 of 1
APPLICATION NO.  : 12/088652
DATED            : June 21, 2011
INVENTOR(S)      : Lindgren It is certified that error appears in the above-identified patent and that said Letters Patent is hereby corrected as shown below:

On the Title Page, Item (57), under "ABSTRACT", Line 12, delete "(xv(n))" and insert -- ($x_v(n)$) --, therefor.

In Column 2, Line 37, delete "reception" and insert -- reception. --, therefor.

In Column 7, Lines 44-45, in Equation (13), delete "$Ry_{vv}(k)Ry_{hv}(m)+Ry_{vh}(m)Ry_{hv}(k)$" and insert -- $Ry_{vv}(k)Ry_{hh}(m)+Ry_{vh}(m)Ry_{hv}(k)$ --, therefor.

In Column 8, Lines 40-44, in Equation (15), delete "$\begin{vmatrix} d_{12}d_{12} \\ d_{32} \\ d_{21} \\ 1 \end{vmatrix}$" and insert -- $\begin{vmatrix} d_{12}d_{21} \\ d_{12} \\ d_{21} \\ 1 \end{vmatrix}$ --, therefor.

In Column 9, Line 37, in Claim 4, delete "anyone of the claim 2," and insert -- claim 2, --, therefor.

Signed and Sealed this
Thirteenth Day of December, 2011

David J. Kappos
*Director of the United States Patent and Trademark Office*